United States Patent
Berndt

(10) Patent No.: US 10,094,623 B2
(45) Date of Patent: Oct. 9, 2018

(54) ARRANGEMENT COMPRISING A SEALING ELEMENT AND A HEAT EXCHANGER, IN AN AIR CHANNEL

(71) Applicant: BEHR GMBH & CO. KG, Stuttgart (DE)

(72) Inventor: Ralf Berndt, Ditzingen-Schöckingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 140 days.

(21) Appl. No.: 14/404,154

(22) PCT Filed: May 28, 2013

(86) PCT No.: PCT/EP2013/060920
§ 371 (c)(1),
(2) Date: Nov. 26, 2014

(87) PCT Pub. No.: WO2013/178604
PCT Pub. Date: Dec. 5, 2013

(65) Prior Publication Data
US 2015/0159961 A1    Jun. 11, 2015

(30) Foreign Application Priority Data

May 30, 2012   (DE) .................. 10 2012 209 126

(51) Int. Cl.
*F28F 1/00*     (2006.01)
*F28F 9/00*     (2006.01)
*B60H 1/00*     (2006.01)

(52) U.S. Cl.
CPC .......... *F28F 1/00* (2013.01); *B60H 1/00521* (2013.01); *B60H 1/00321* (2013.01);
(Continued)

(58) Field of Classification Search
CPC .. F28F 2280/06; F28F 2009/004; F28F 9/001; F28F 9/002; F28F 9/005;
(Continued)

(56) References Cited

U.S. PATENT DOCUMENTS 3,121,467 A * 2/1964 Bryant ................... B60K 11/04
                                                                    165/69
5,632,328 A * 5/1997 Sawyer .............. B60H 1/00321
                                                                    165/67
(Continued)

FOREIGN PATENT DOCUMENTS

CN        1157227 A       8/1997
DE     42 36 674 A1       5/1994
(Continued)

OTHER PUBLICATIONS

International Search Report, PCT/EP2013/060920, dated Oct. 9, 2013, 2 pgs.
(Continued)

*Primary Examiner* — Frantz Jules
*Assistant Examiner* — Lionel Nouketcha
(74) *Attorney, Agent, or Firm* — Paul D. Strain, Esq.; Strain & Strain PLLC

(57) ABSTRACT

Arrangement comprising a sealing element and a heat exchanger, in an air channel, wherein the heat exchanger has a plurality of pipes which carry a first fluid and are defined in their end regions by collection vessels and can have a second fluid flowing around them. The arrangement is characterized in that the air channel has a first guide groove on an inner surface, which guide groove is formed by a first web and a second web, and a second guide groove which is formed by a third web and a fourth web, the third web and the fourth web being disposed between the first web and the second web and the sealing element enveloping the heat exchanger along the collecting vessels and its short sides.

9 Claims, 3 Drawing Sheets

(52) U.S. Cl.
CPC ............... *B60H 1/00585* (2013.01); *B60H 2001/00635* (2013.01); *F28F 9/001* (2013.01); *F28F 9/002* (2013.01); *F28F 2225/02* (2013.01); *F28F 2230/00* (2013.01); *F28F 2265/30* (2013.01); *F28F 2280/06* (2013.01)

(58) Field of Classification Search
CPC .... F28F 2265/30; F28F 21/06; F28F 2225/02; F28F 2255/02; F28F 2230/00; B60H 1/00521; B60H 1/00585; B60H 2001/00635; B60H 1/00321; F28D 2021/008
USPC .................................................. 165/149, 173
See application file for complete search history.

(56) References Cited

U.S. PATENT DOCUMENTS

| | | | | |
|---|---|---|---|---|
| 6,598,411 | B2* | 7/2003 | Nomura | B60H 1/00521 62/239 |
| 2002/0112906 | A1* | 8/2002 | Guyomard | B60K 11/04 180/68.4 |
| 2009/0120610 | A1* | 5/2009 | Coyle | B60H 1/00321 165/67 |
| 2009/0313899 | A1* | 12/2009 | Tokunaga | B60H 1/00692 49/40 |
| 2011/0005730 | A1* | 1/2011 | Habasita | B60H 1/00028 165/121 |
| 2015/0144757 | A1* | 5/2015 | Fieger | B60H 1/00521 248/232 |

FOREIGN PATENT DOCUMENTS

| | | |
|---|---|---|
| DE | 195 24 668 A1 | 1/1997 |
| DE | 196 34 100 A1 | 2/1998 |
| DE | 196 54 776 A1 | 7/1998 |
| DE | 102 42 899 A1 | 4/2003 |
| DE | 10 2004 017 339 A1 | 10/2005 |
| DE | 199 18 167 B4 | 1/2008 |
| DE | 10 2009 000 558 A1 | 8/2010 |
| EP | 0 860 675 A2 | 8/1998 |
| EP | 2 058 156 A1 | 5/2009 |
| EP | 2058156 A1 * | 5/2009 ......... B60H 1/00321 |

OTHER PUBLICATIONS

German Search Report, 10 2012 209 126.2, dated Mar. 6, 2013, 5 pgs.

* cited by examiner

ARRANGEMENT COMPRISING A SEALING ELEMENT AND A HEAT EXCHANGER, IN AN AIR CHANNEL

CROSS-REFERENCE TO RELATED PATENT APPLICATIONS

This application is a National Stage of International Application No. PCT/EP2013/060920, filed May 28, 2013, which is based upon and claims the benefit of priority from prior German Patent Application No. 10 2012 209 126.2, filed May 30, 2012, the entire contents of all of which are incorporated herein by reference in their entirety.

TECHNICAL FIELD

The invention relates to an arrangement comprising a sealing element and a heat exchanger, in an air channel, the heat exchanger having a multiplicity of tubes which conduct a first fluid, are delimited in their end regions by way of manifolds, and can be flowed around by a second fluid. Moreover, the invention relates to an arrangement in an air channel of an air conditioning system and to an arrangement in accordance with the preamble of claim 9.

PRIOR ART

Heat exchangers, such as evaporators or heating elements in air conditioning systems for use in motor vehicles, are as a rule arranged in an air channel of the air conditioning system. In the interior thereof, they are flowed through by a coolant. Air is used as a rule as medium which flows around the heat exchanger from the outside.

The greatest heat transfer is possible when as much as possible of said air flows through the network of tubes and corrugated fins, and only as small a part as possible of the air flows past the heat exchanger on the outside, in particular between the inner walls of the air channel and the outer faces of the heat exchanger. In order to keep the proportion of air which flows past the heat exchanger as low as possible, it is appropriate to close the gap which results between the heat exchanger and the air channel by way of additional sealing means. Here, either soft materials such as foams or hard plastic parts are used.

The possible formation of odor which can be produced as a result of the settling of dirt and bacteria in the foam is a disadvantage of the use, in particular, of large-pore foam.

A disadvantage of the use of hard plastic parts is, in particular, the high complexity which is associated with the dimensionally accurate construction of the sealing elements, and the possibility that acoustic bridges which lead to the transmission of disruptive noise are produced between the heat exchanger and the air channel as a result of direct contact.

SUMMARY OF THE INVENTION, OBJECT, ACHIEVEMENT, ADVANTAGES

It is therefore the object of the present invention to provide an arrangement for a heat exchanger, which arrangement effectively prevents a disruptive formation of odor and additionally does not allow any disruptive acoustic bridges to be produced between the heat exchanger and the air channel of the air conditioning system.

The object of the present invention is achieved by way of an arrangement having the features as claimed in claim 1.

An arrangement is advantageous, comprising a sealing element and a heat exchanger, in an air channel, the heat exchanger having a multiplicity of tubes which conduct a first fluid, are delimited in their end regions by way of manifolds, and can be flowed around by a second fluid, the air channel having a first guide groove on an inner face, which first guide groove is formed by a first web and a second web, and has a second guide groove which is formed by a third web and a fourth web, the third web and the fourth web being arranged between the first web and the second web, and the sealing element encompassing the heat exchanger along the manifolds and its short sides.

A very advantageous sealing action of the heat exchanger against the air channel can be achieved by way of the sealing element which runs around the entire circumference of the heat exchanger. The proportion of leakage air which flows past the heat exchanger between the heat exchanger and the air channel can thus be minimized. Furthermore, decoupling of the heat exchanger from the air channel can be achieved.

It is also advantageous if the heat exchanger is plugged with one of the manifolds into the first guide groove and in the process the sealing element is plugged into the second guide groove. The two guide grooves form an embodiment which is particularly simple and at the same time stable for receiving the heat exchanger.

Moreover, it is expedient if the sealing element is supported on one of the inner faces of the air channel and on those sides of the third web and the fourth web which face one another. Fixing of the heat exchanger with simultaneous decoupling is achieved via the support of the sealing element which is stressed around the heat exchanger, which is advantageous, in particular, with regard to vibrations which occur.

In a further preferred embodiment, it is expedient if the heat exchanger is fixed substantially via the supporting action of the sealing element with respect to the inner face and with respect to the first guide groove. This ensures, in particular, the decoupling of the heat exchanger with respect to the air channel of the air conditioning system.

Furthermore, it is advantageous if the sealing element is formed from an elastic material. The elastic material properties are advantageous with regard to the decoupling.

It is also expedient if the sealing element is formed by a solid rubber O-ring or by a hollow profile rubber or by a foam with closed pores. A supporting action of the heat exchanger with respect to the air channel is achieved by way of all three possible sealing elements and, moreover, a decoupling action on account of the damping properties of the elastic material, which is advantageous with regard to the service life of the heat exchanger. The use of a foam with closed pores is particularly advantageous in comparison with the prior art, since it is thus avoided effectively that moisture collects in the foam which can lead to the formation of odor as a result of bacterial growth.

Furthermore, it is advantageous if the sealing element seals the heat exchanger against the inner faces of the air channel. As a result, the sealing action is influenced advantageously, it being desirable to achieve as great a sealing action as possible.

Moreover, it is expedient if the heat exchanger is plugged with both manifolds in each case into a first guide groove and with the sealing element in each case into a second guide groove, the first guide grooves and the second guide grooves being arranged on the inner faces of the air channel which lie opposite one another.

Advantageous developments of the present invention are described in the subclaims and in the following description of the figures.

BRIEF DESCRIPTION OF THE DRAWINGS

In the following text, the invention will be explained in detail using one exemplary embodiment with reference to the drawing, in which.

PREFERRED EMBODIMENT OF THE INVENTION

Figure 1:
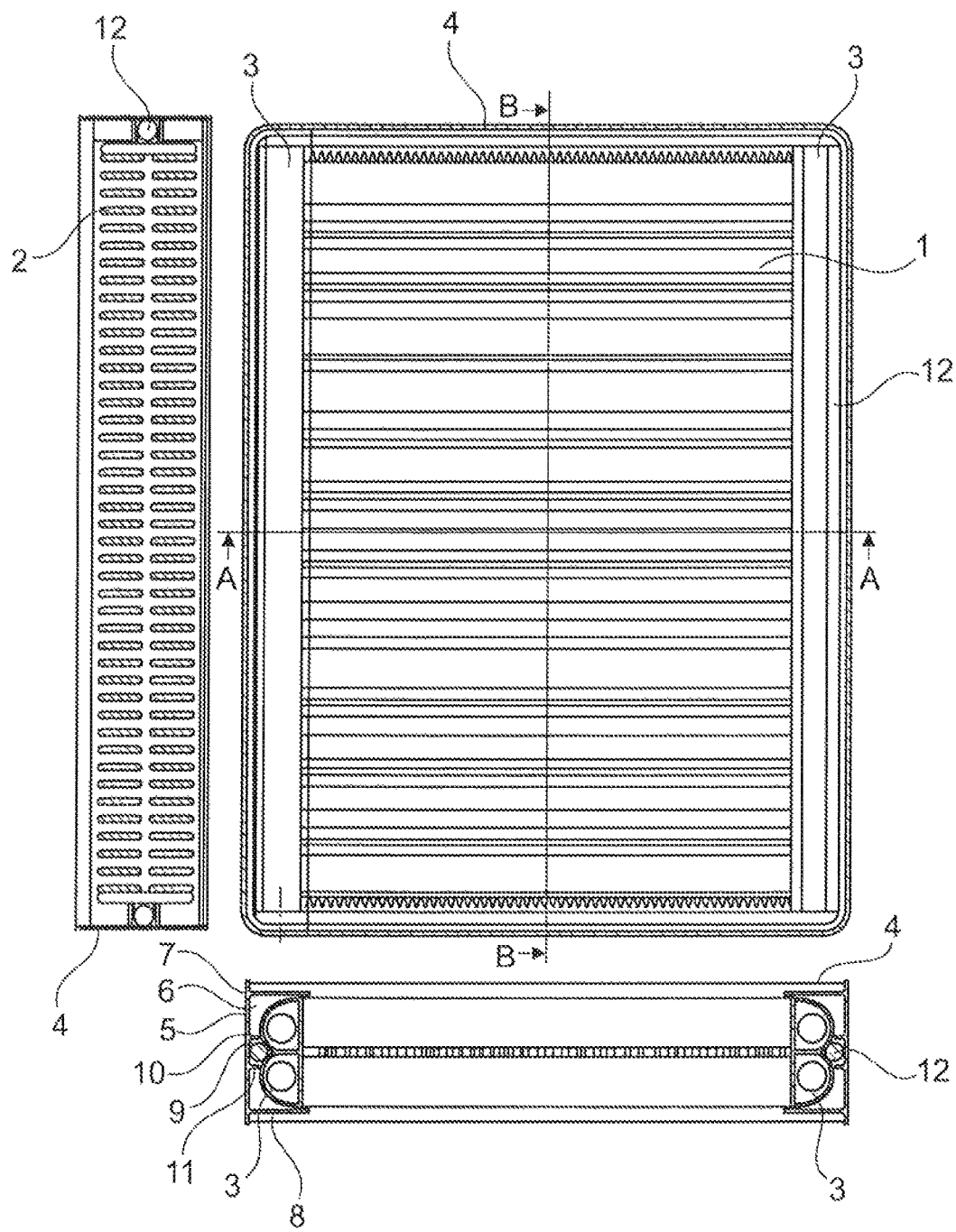
FIG. 1 shows a plan view of a heat exchanger in an air channel and, moreover, two sectional views of the heat exchanger.

FIG. 1 shows a plan view of a heat exchanger 1 which is formed from a multiplicity of tubes 2 which are flowed or streamed through by a fluid. The tubes 2 are received in manifolds 3 at their end regions. The heat exchanger 1 corresponds substantially to the construction which is known in the prior art for heat exchangers of this type.

The heat exchanger 1 is installed in an air channel 4 of an air conditioning system of a motor vehicle. In order to reduce leakage air within the air channel 4 and to position the heat exchanger 1 in the air channel 4, the heat exchanger 1 has a circumferential sealing element 12 which is intended to seal it against the inner faces 5 of the air channel 4.

Moreover, FIG. 1 shows two further views of the heat exchanger 1:

The section through the heat exchanger 1, corresponding to the sectional line B-B which is illustrated in the main part of FIG. 1, can be seen in the left-hand part of FIG. 1. In particular, the sealing element 12 can be seen in this region, which sealing element 12 encompasses the heat exchanger 1 along the manifolds 3 and the short sides which run parallel to the tubes 2 which are arranged within the heat exchanger 1.

A second section through the heat exchanger 1, corresponding to the illustrated sectional line A-A, is depicted in the lower part of FIG. 1. It can be seen in this lower sectional image, in particular, how the heat exchanger 1 is plugged with its manifolds 3 into a plurality of grooves 6, 9 which are arranged on an inner face 5 of the air channel 4.

In particular, the arrangement of the grooves 6, 9 and of the webs 7, 8, 10, 11 which form the grooves 6, 9 is shown in detail in the following FIG. 2. Three detailed views of the heat exchanger 1 are shown below one another in FIG. 2. The three detailed views differ substantially in terms of the type of sealing element. The sealing element 12 is shown in the upper detailed view of FIG. 2, the sealing element 13 is shown in the middle detailed view, and the sealing element 14 is shown in the lower detailed view. All the remaining designations are consistent for all three embodiment types and are added only in the upper exemplary embodiment. All three views are detailed sectional views along the sectional line A-A of the heat exchanger 1 which is shown in FIG. 1. In the following text, merely the construction of the upper exemplary embodiment will be described in detail and in each case only the modified sealing element 13, 14 will be described with regard to the two lower exemplary embodiments.

The inner face 5 of the air channel 4 has a total of two grooves 6, 9. The larger groove 6 is formed by the web 7 and the web 8. The second groove 9 is arranged between the webs 7, 8, which second groove 9 for its part is formed by the web 10 and the web 11. The larger groove 6 serves to receive one of the manifolds 3 of the heat exchanger 1. In contrast, the smaller groove 9 serves to receive the sealing element 12 which runs along the manifold 3 of the heat exchanger 1. As an alternative, instead of the two grooves 6, 9, holders of corresponding configuration can also be used.

Figure 2:
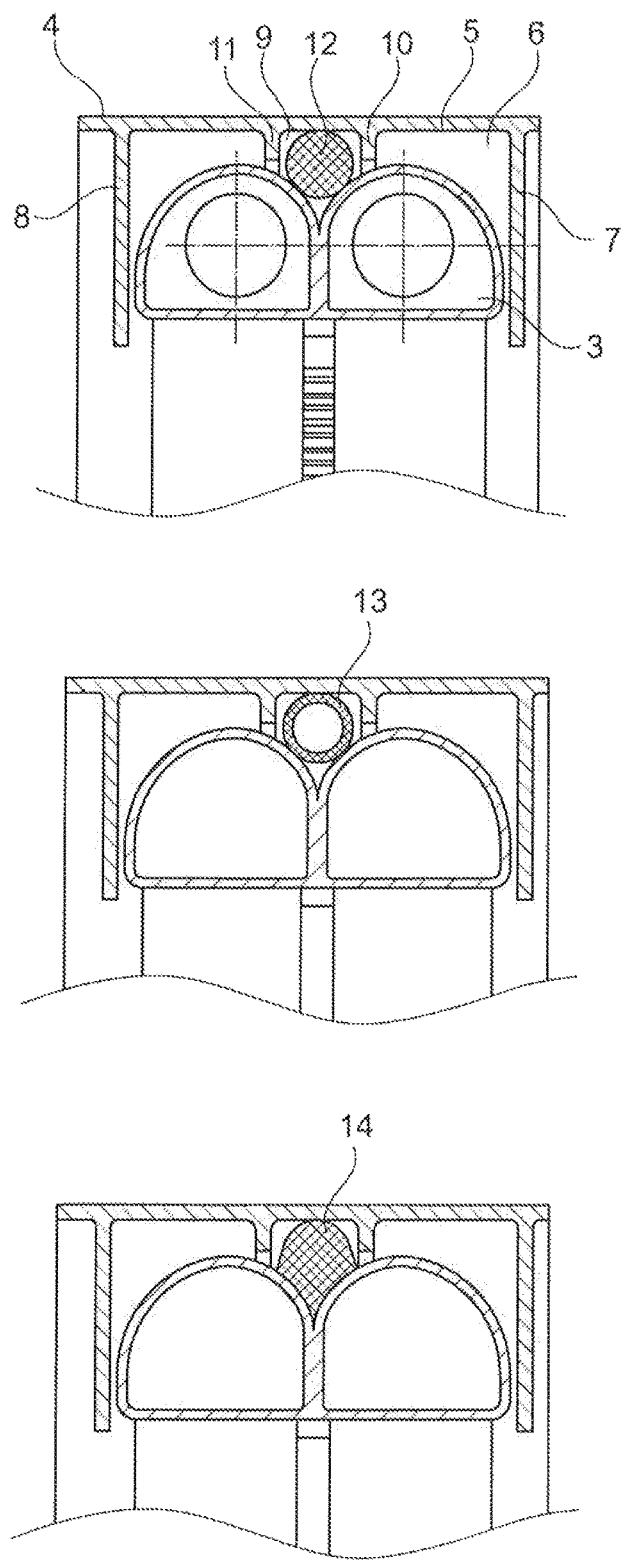
FIG. 2 shows three detailed sections in the region of one of the manifolds of the heat exchanger with three different sealing elements.
Figure 3:
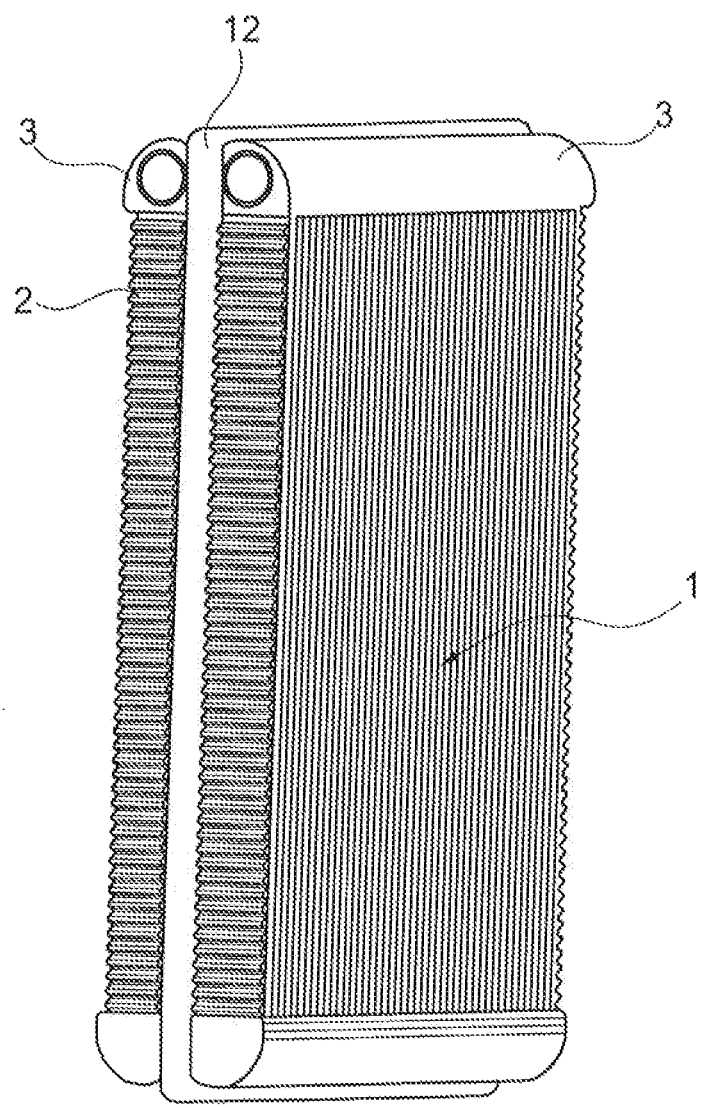
FIG. 3 shows a perspective view of the heat exchanger with a sealing element which encompasses it.

At its end regions, the heat exchanger 1 which is shown in FIGS. 1 to 3 has in each case manifolds 3 which have the form of a B in section. The sealing element 12, 13, 14 is arranged in each case along the butt joint of the two outer curves of a manifold 3.

Other shapes of the manifold can be conceivable in alternative embodiments. A notch, as is present in the vicinity of the butt joint of the two curves, as shown in FIGS. 1 to 3, is not absolutely necessary. The sealing element 12, 13, 14 can likewise be oriented on other physical features of the manifold. For instance, webs or fins which run on the outer contour of the manifold would be conceivable here.

In the embodiments which are shown in FIG. 2, the manifold 3 can be supported to the right and to the left in each case on the web 7 and web 8, respectively. The sealing element 12, 13, 14 is supported firstly on the inner face 5 of the air channel 4 and secondly on the webs 10, 11 of the groove 9.

The support of the heat exchanger 1 with respect to the air channel 4 is achieved substantially by way of the sealing element 12, 13, 14. The groove 6 is dimensioned in such a way that there is no direct contact between the manifold 3 of the inner face 5 of the air channel 4 or the two webs 7, 8 of the groove 6 in the installed position. The second groove 9 is likewise dimensioned in such a way that the webs 10, 11 are not in direct contact with the manifold 3 of the heat exchanger 1. In this way, decoupling of the heat exchanger 1 from the housing of the air conditioning system and, in particular, the air channel 4 is produced. The webs 10, 11 are in direct contact only with the sealing element 12, 13, 14.

The heat exchanger 1 is therefore held by way of the contact points between the sealing element 12, 13, 14 with the webs 10, 11 and the inner face 5 in the region of the manifolds 3 of the heat exchanger 1, and by way of contact points of the sealing element 12, 13, 14 with the inner face 5 in the region of the short sides which run parallel to the tubes 2 which are arranged within the heat exchanger 1.

In the case of pronounced vibration and therefore relative movements of the heat exchanger 1 in comparison with the air channel 4, the webs 7, 8 of the groove 6 develop a supporting action on the manifold 3 which is held in its position by way of them.

The sealing element 12 which is shown in the upper exemplary embodiment of FIG. 2 consists of a solid rubber O-ring. The latter encompasses the entire heat exchanger 1 along the two manifolds 3 and its two short sides which run parallel to the tubes 2 which are arranged within the heat exchanger 1.

The sealing element 13 is configured as a hollow profile rubber in the middle exemplary embodiment of FIG. 2. Said hollow profile rubber which forms the sealing element 13 also encompasses the heat exchanger 1 in an analogous manner to the exemplary embodiment in the upper depiction of FIG. 2.

In the lower exemplary embodiment of FIG. 2, the sealing element 14 is formed by way of a closed-pore foam. Said close-pore foam also encompasses the heat exchanger 1 in an analogous manner to the exemplary embodiments above it.

The exemplary embodiments of FIG. 2 in each case show a detailed view of a manifold 3 of the heat exchanger 1. In order to ensure reliable holding of the heat exchanger 1 within the air channel 4, the respectively second manifold 3 which is not shown in the illustrations of FIG. 2 is positioned in the same way in the housing and in the air channel 4.

FIG. 3 shows a perspective view of the heat exchanger 1 with the sealing element 12 which is a solid rubber O-ring. It can be seen from the illustration in FIG. 3 how the sealing element 12 encompasses the entire heat exchanger 1 along its manifolds 3 and its short sides which run parallel to the tubes 2 which are arranged within the heat exchanger 1.

The invention claimed is:

1. An arrangement in an air channel comprising:
   a sealing element and a heat exchanger,
   the heat exchanger having a multiplicity of tubes which conduct a first fluid, are delimited in their end regions by way of manifolds, and can be flowed around by a second fluid,
   wherein the air channel has a first guide groove on an inner face, which first guide groove is formed by a first web and a second web, wherein the air channel has a second guide groove which is formed by a third web and a fourth web, wherein the third web and the fourth web are parallel to the first web and the second web and are arranged between the first web and the second web, wherein the first web, second web, third web, and fourth web each project directly from a planar surface of the inner face of the air channel to a free end in the air channel, and wherein the sealing element circumferentially encompasses the heat exchanger along butt joints formed in each manifold located at the end region of the tubes and along shorter sides of the heat exchanger which run parallel to the multiplicity of tubes,
   wherein the sealing element is formed by a solid rubber O-ring, by a hollow profile rubber, or by a foam with closed pores, wherein the sealing element has a substantially elliptical or circular cross section and at least partially circumscribes the heat exchanger and the manifolds, wherein the air channel contacts the heat exchanger only through the sealing element,
   wherein the heat exchanger is plugged with one of the manifolds into the first guide groove and in the process the sealing element is plugged into the second guide groove.

2. The arrangement as claimed in claim 1, wherein the sealing element is supported on the inner face of the air channel and on those sides of the third web and the fourth web which face one another.

3. The arrangement as claimed in claim 1, wherein the heat exchanger is fixed substantially via the supporting action of the sealing element with respect to the inner face and with respect to the second guide groove.

4. The arrangement as claimed in claim 1, wherein the sealing element is formed from an elastic material.

5. The arrangement as claimed in claim 1, wherein the sealing element seals the heat exchanger against the inner faces of the air channel.

6. The arrangement as claimed in claim 1, further comprising:
   a second first guide groove arranged on an opposite side of the air channel with respect to the first guide groove,
   a second second guide groove arranged on an opposite side of the air channel with respect to the second guide groove,
   wherein the sealing element is arranged on butt joints of a first and second manifold,
   wherein the heat exchanger is arranged in the air channel by inserting the first and second manifold and the sealing element into the first guide groove, the second guide groove, the second first guide groove, and the second second guide groove, wherein the first and the second manifolds fit into the first guide groove and the second first guide groove, and wherein the sealing element fits into second guide groove and the second second guide groove.

7. The arrangement as claimed in claim 1, wherein the first guide groove and the second guide groove are formed on the same wall.

8. The arrangement as claimed in claim 1, wherein the first web, second web, third web, and fourth web are formed on the same wall.

9. An arrangement in an air channel comprising:
   a sealing element and a heat exchanger,
   the heat exchanger having a multiplicity of tubes which conduct a first fluid, are delimited in their end regions by way of manifolds, and can be flowed around by a second fluid,
   wherein the air channel has a first guide groove on an inner face, which first guide groove is formed by a first web and a second web, wherein the air channel has a second guide groove which is formed by a third web and a fourth web, wherein the third web and the fourth web are parallel to the first web and the second web and are arranged between the first web and the second web, wherein the first web, second web, third web, and fourth web each project directly from a planar surface of the inner face of the air channel to a free end in the air channel, and wherein the sealing element circumferentially encompasses the heat exchanger along butt joints formed in each manifold located at the end region of the tubes and along shorter sides of the heat exchanger which run parallel to the multiplicity of tubes,
   wherein the sealing element is formed by a solid rubber O-ring or by a hollow profile rubber or by a foam with closed pores, wherein the air channel contacts the heat exchanger only through the sealing element, wherein the sealing element has a substantially elliptical or circular cross section and at least partially circumscribes the heat exchanger and the manifolds,
   wherein one of the manifolds is arranged in the first guide groove, wherein the sealing element is arranged in the second guide groove, wherein the sealing element abuts the inner face of the air channel and those sides of the third web and the fourth web which face one another,
   wherein the heat exchanger is fixed substantially via the supporting action of the sealing element with respect to the inner face and with respect to the second guide groove, wherein the sealing element is formed from an elastic material, wherein the first web, second web, third web, and fourth web are formed on the same wall.

* * * * *